US008092948B2

(12) United States Patent
Hody et al.

(10) Patent No.: US 8,092,948 B2
(45) Date of Patent: Jan. 10, 2012

(54) ENERGY PRODUCTION UNIT INTEGRATING A BURNER AND A FUEL CELL

(75) Inventors: Stéphane Hody, Bry sur Marne (FR); Jean-François Fourmigue, Fontaine (FR)

(73) Assignee: Gaz de France, Paris (FR)

( * ) Notice: Subject to any disclaimer, the term of this patent is extended or adjusted under 35 U.S.C. 154(b) by 1009 days.

(21) Appl. No.: 11/943,636

(22) Filed: Nov. 21, 2007

(65) Prior Publication Data

US 2008/0138664 A1   Jun. 12, 2008

(30) Foreign Application Priority Data

Nov. 24, 2006   (FR) ...................................... 06 10332

(51) Int. Cl.
*H01M 8/04* (2006.01)
*F23N 5/24* (2006.01)

(52) U.S. Cl. ........ 429/436; 429/441; 429/442; 429/433; 431/23

(58) Field of Classification Search ........................ None
See application file for complete search history.

(56) References Cited

U.S. PATENT DOCUMENTS

| | | | | |
|---|---|---|---|---|
| 3,961,986 A | * | 6/1976 | Waldman | 429/423 |
| 4,128,700 A | * | 12/1978 | Sederquist | 429/415 |
| 4,670,357 A | * | 6/1987 | Taylor | 429/535 |
| 5,612,149 A | * | 3/1997 | Hartvigsen et al. | 429/423 |
| 7,531,016 B2 | * | 5/2009 | Yamamoto et al. | 48/127.9 |
| 2003/0134168 A1 | | 7/2003 | Assarabowski et al. | |
| 2004/0229096 A1 | | 11/2004 | Standke et al. | |

FOREIGN PATENT DOCUMENTS

| JP | 62 136774 A | 6/1987 |
|---|---|---|
| WO | WO 2005/038973 A1 | 4/2005 |
| WO | WO 2006/072652 A2 | 7/2006 |

* cited by examiner

*Primary Examiner* — Cynthia Lee

(74) *Attorney, Agent, or Firm* — Miles & Stockbridge P.C.

(57) ABSTRACT

The invention concerns an energy production unit, of electric energy in particular, comprising a fuel cell (1) and a heat source (2) thermally coupled to the fuel cell (1) at least to allow the rise in temperature of this fuel cell (1).

According to the invention, it is provided that the heat source (2) comprises a radiating burner (20), that the fuel cell (1) is confined within a thermal insulation enclosure itself heated by the combustion gases (F) derived from the burner (20), and that this unit also comprises temperature regulation means (4) capable of controlling, from around 200° C. to at least 800° C., the temperature of the combustion gases (F) heating the enclosure 3.

25 Claims, 5 Drawing Sheets

ENERGY PRODUCTION UNIT INTEGRATING A BURNER AND A FUEL CELL

The invention generally concerns techniques for the production of energy.

More precisely, the invention concerns an energy production unit, of electric power in particular, comprising a fuel cell confined in a thermal insulation enclosure and a heat source thermally coupled to the fuel cell at least to allow the temperature rise of this fuel cell, this heat source comprising at least one first radiating burner.

Units of this type are described for example in US patents 2003/134168, WO 2006/072652, US 2004/229096 and WO 2005/038973.

Although they are gradually becoming known to those skilled in the art, energy production units of this type are always associated with design and operating constraints, which at the present time limit their technical and economic development.

In particular, insofar as fuel cells can only function after a temperature rise that is both slow and spatially homogeneous, they have been heated up until now by circulation of an electric current in a resistance, which necessitates the recourse to an electric current source even before the fuel cell itself is able to produce power.

The particular purpose of the invention, which lies within this context, is to propose an energy production unit free of this defect.

For this purpose, the energy production unit of the invention, conforming to the general definition given in the preamble above, is essentially characterized in that the thermal insulation enclosure is heated by the combustion gases derived from the first burner, and in that this unit also comprises temperature regulation means capable of controlling, between around 200° C. and at least 800° C., the temperature of the combustion gases heating the enclosure.

Therefore the fuel cell used in the unit of the invention can be set in operation by consumption of a fuel e.g. the fuel used in the fuel cell, without requiring the recourse to an electric power source.

Preferably, the enclosure is provided with at least one radiation shield protecting this enclosure against infrared radiation emitted by the first burner.

The regulation means may in particular comprise at least one heat exchanger and/or a variable feed controller supplying fuel mix to the first burner, then consisting for example of a burner of catalytic combustion type, and/or an adjustable inlet of cool air used to cool the combustion gases produced by the first burner before they heat the enclosure.

The fuel cell is advantageously of solid oxide type, so that it can withstand high temperatures.

The energy production unit of the invention may also comprise heat circulation means including a heat exchanger and a heating circuit, this unit then allowing the simultaneous production of heat and electricity.

In this case, the exchanger of the regulation means is mounted in parallel for example on the exchanger of the heat circulation means.

The unit of the invention may also comprise a second burner thermally coupled to the exchanger of the heat circulation means.

The fuel cell is supplied with combustible gas for example, and this unit advantageously comprises a recycling channel which directs non-burnt combustible gas leaving the cell towards a burner.

To ensure its optimised yield, the energy production unit of the invention may also be provided with a cooling channel directing the burnt gases leaving the cell towards an exchanger.

Other characteristics and advantages of the invention will become more clearly apparent from the following description given by way of indication and is in no way limiting, with reference to the appended drawings in which.

As stated above, the invention concerns an energy production unit comprising a fuel cell 1 able to produce electric power and preferably of solid oxide type, and a heat source 2 thermally coupled to the fuel cell 1 at least to allow the temperature rise of this fuel cell 1.

Figure 1:
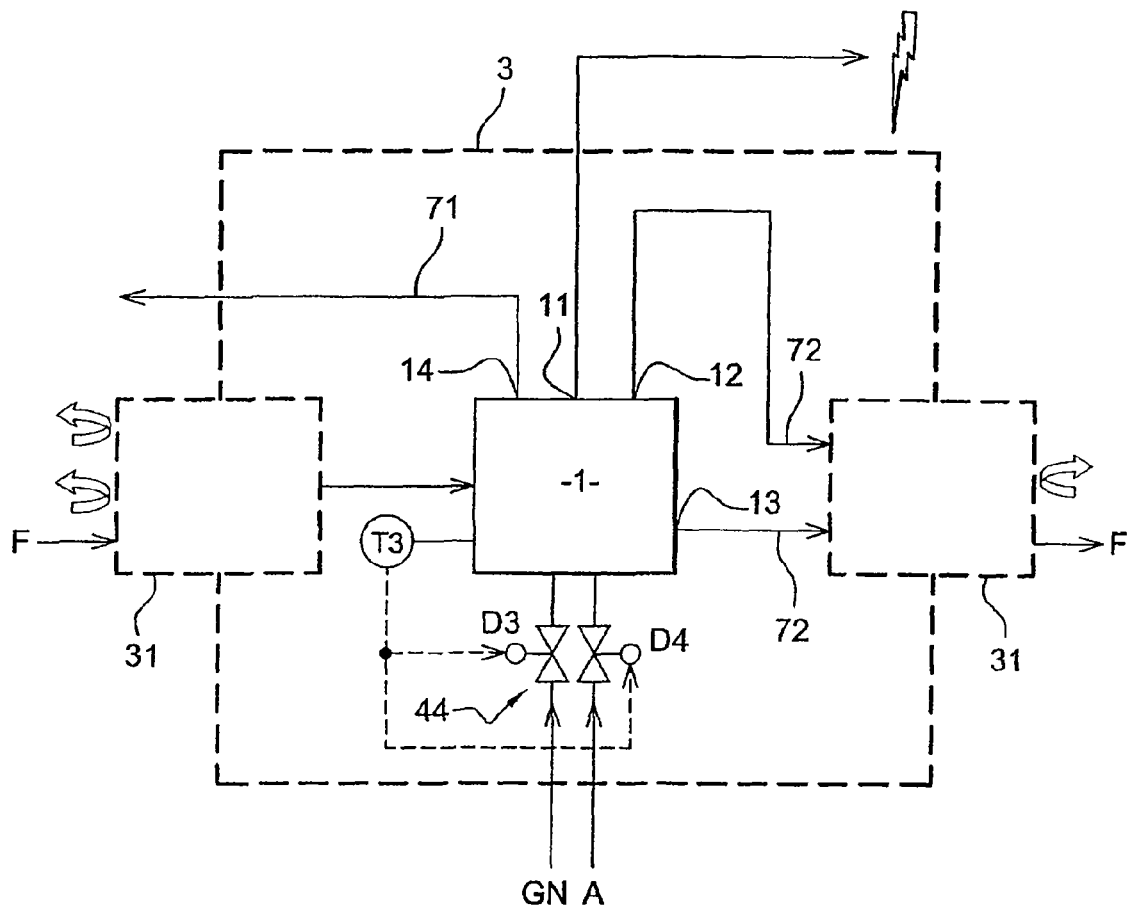
FIG. 1 is a diagram illustrating the immediate environment of the fuel cell used in a unit conforming to the invention.

According to the invention, the heat source 2 essentially consists of a radiating burner 20 and the fuel cell 1 is confined within a thermal insulation enclosure 3 (FIG. 1) heated by the combustion gases F from the burner 20.

For reasons of clarity the enclosure 3 surrounding the fuel cell 1 is voluntarily omitted from FIGS. 2 to 5.

So as to control the temperature T3 of the fuel cell 1, the production unit of the invention also comprises temperature regulation means 4 (FIGS. 2 to 5) designed to control the temperature T2 of the combustion gases F heating the enclosure 3, from around 200° C. to 1100° C. for example, this temperature being controlled at least up to 800° C.

The temperature gradient within the fuel cell 1 may be further reduced by equipping the enclosure 3 with one or more radiation shields 31 whose function is to protect this enclosure 3 against infrared radiation emitted by the burner 20.

FIGS. 2 to 5 show particularly advantageous embodiments of the invention, in which the production unit of the invention comprises heat circulation means 5 including a heat exchanger 51 and a heating circuit 52, this unit then allowing the simultaneous production of electricity and heat, in particular for the heating of water in a hot water tank B and/or in one or more radiators R.

Figure 2:
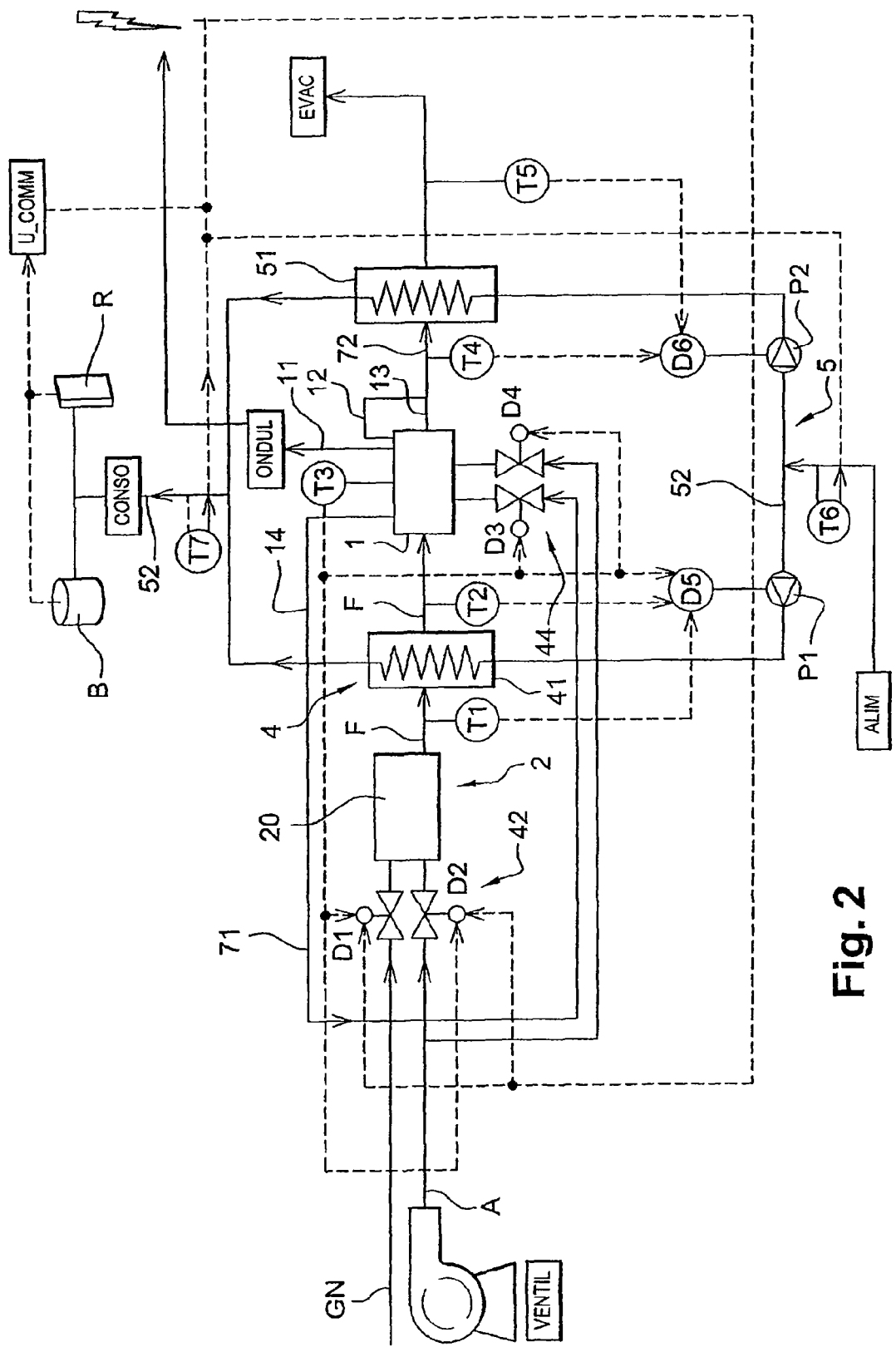
FIG. 2 is a general diagram illustrating a first possible embodiment of a production unit conforming to the invention.
Figure 3:
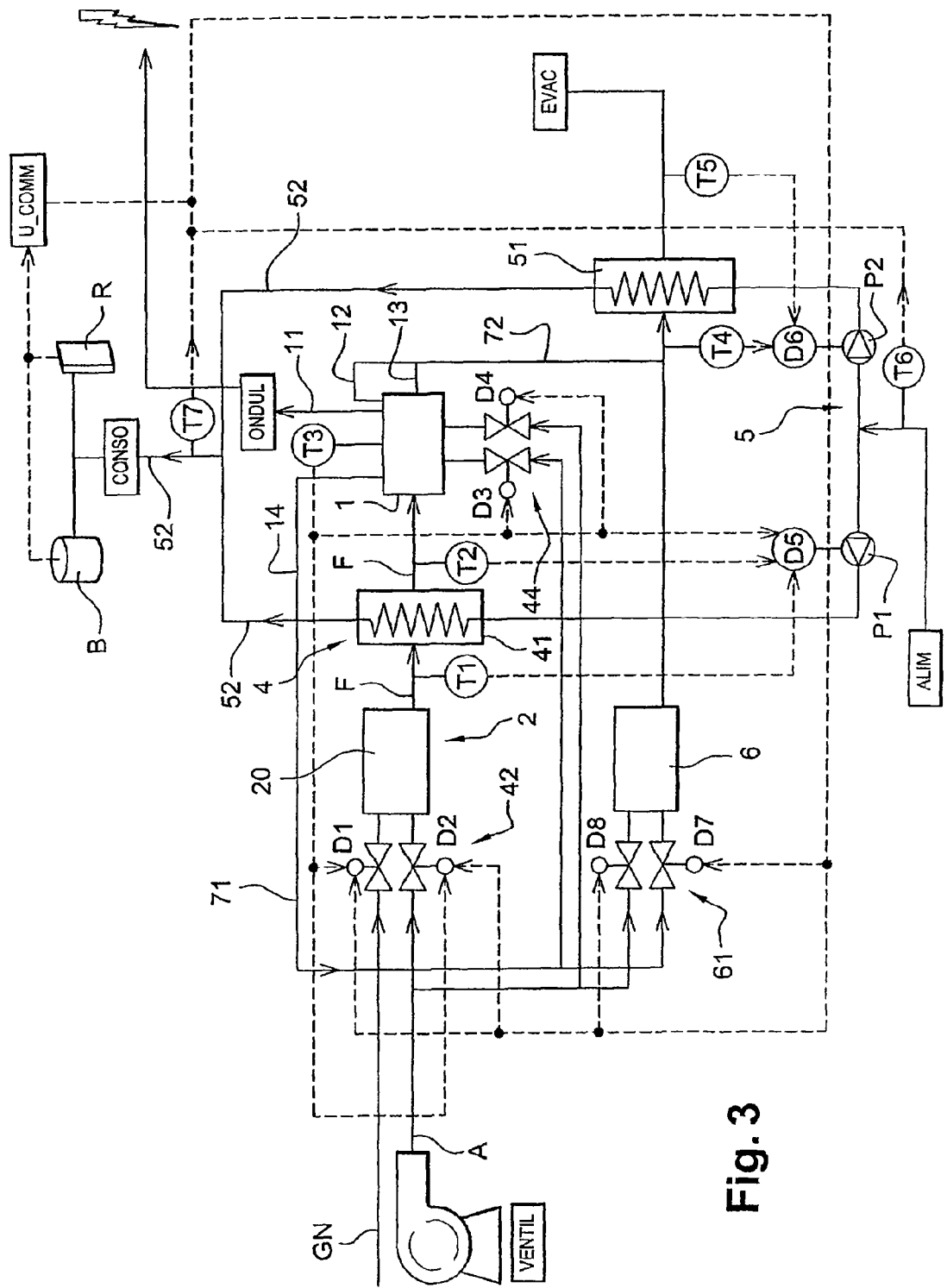
FIG. 3 is a general diagram illustrating a second possible environment of a production unit conforming to the invention.

In the embodiment shown FIGS. 2 and 3, the temperature regulation means 4 of the fuel cell 1 comprise at least one heat exchanger 41 essentially dedicated to this regulating.

However, since the production unit of the invention illustrated FIGS. 2 to 5 is intended to supply not only electricity but also heat, the regulation means 4 are preferably integrated within a more complete regulation system, also comprising a command unit U_COMM, temperature sensors, and flow control valves, these parts being connected to each other by communication links shown as a chain-dotted line.

The command unit U_COMM collects temperature-related information from the sensors, such as T1 to T8, measured at different points of the production unit, and processes this information to adapt flow rates such as D1 to D6, by piloting the different flow control valves.

In the embodiment shown FIG. 2, the burner 20 is supplied with air A and with a combustive gas GN via valves 42 which act as variable feed controller for the supply of fuel mix to this burner.

The combustible gas GN enters the burner 20 at a flow rate D1 and the air, propelled by ventilation VENTIL, enters this burner at a flow rate D2.

The combustion gases F derived from the burner 20, which reach the heat exchanger 41 at a temperature T1, are cooled down to a temperature T2 by water circulating in the exchanger 41 at a variable flow rate D5, regulated by the command unit U_COMM at least in relation to temperature T1, to residual temperature T2 which is the ideal temperature of the combustion gases F when they reach the enclosure 3 to heat this enclosure, and to temperature T3 of the fuel cell.

The fuel cell 1 is itself supplied with combustible gas GN and air A, via valves 44 which act as variable feed controller for this cell and at respective flow rates D3 and D4.

The fuel cell 1 has an outlet 11 delivering electricity which can be used for any type of application after conversion by an inverter ONDUL.

The fuel cell 1 also comprises outlets 12 and 13 connected to a cooling channel 72 which directs burnt, hot gases available on these outlets of the fuel cell 1 towards the heat exchanger 51, these gases then being evacuated downstream of the exchanger 51 by a duct EVAC.

Finally, the fuel cell 1 comprises an outlet 14 connected to a recycling channel 71 which redirects partly non-burnt combustible gas, leaving cell 1 via this outlet 14, towards the burner 20.

In the embodiment shown FIGS. 2 and 3, the circuit 52 of the heating means 5 typically comprises a supply of cold water ALIM at a temperature T6, and equipment CONSO consuming hot water at a temperature T7, such as taps, a hot water tank B and radiators R.

The exchanger 41 used to regulate the temperature of the fuel cell 1 is integrated in this circuit 52, in which it is mounted in parallel with the heat exchanger 51.

The heating circuit 52 also comprises two pumps P1 and P2, whose respective flow rates D5 and D6 are regulated by the command unit U_COMM at least in relation to temperatures T1 and T2 upstream and downstream of the regulation exchanger 41, to temperature T3 of the fuel cell, to temperatures T4 and T5 upstream and downstream of the heat exchanger 51, and optionally in relation to the difference between temperatures T6 and T7 of the cold water and hot water.

Figure 4:
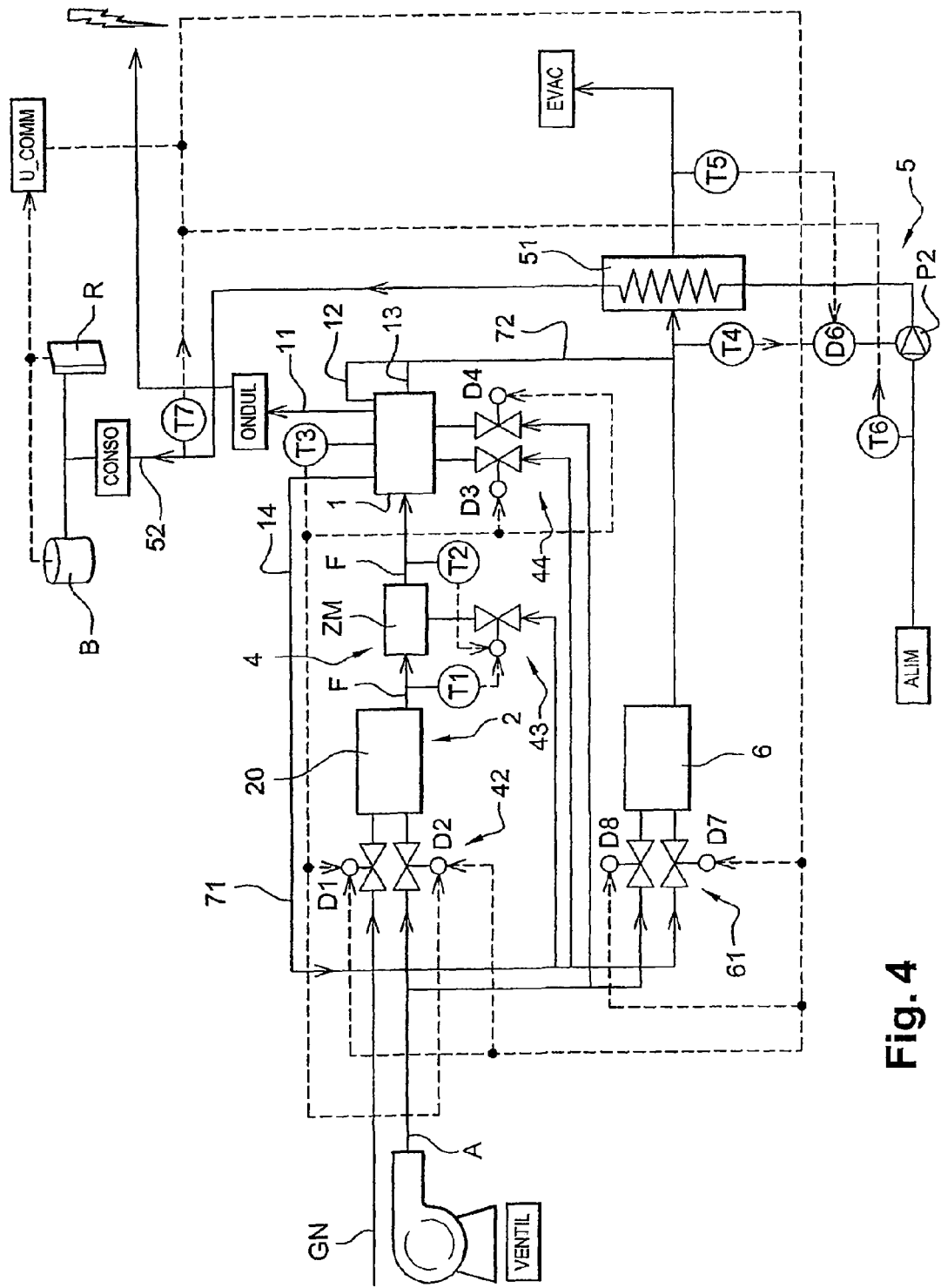
FIG. 4 is a general diagram illustrating a third possible embodiment of a production unit conforming to the invention.
Figure 5:
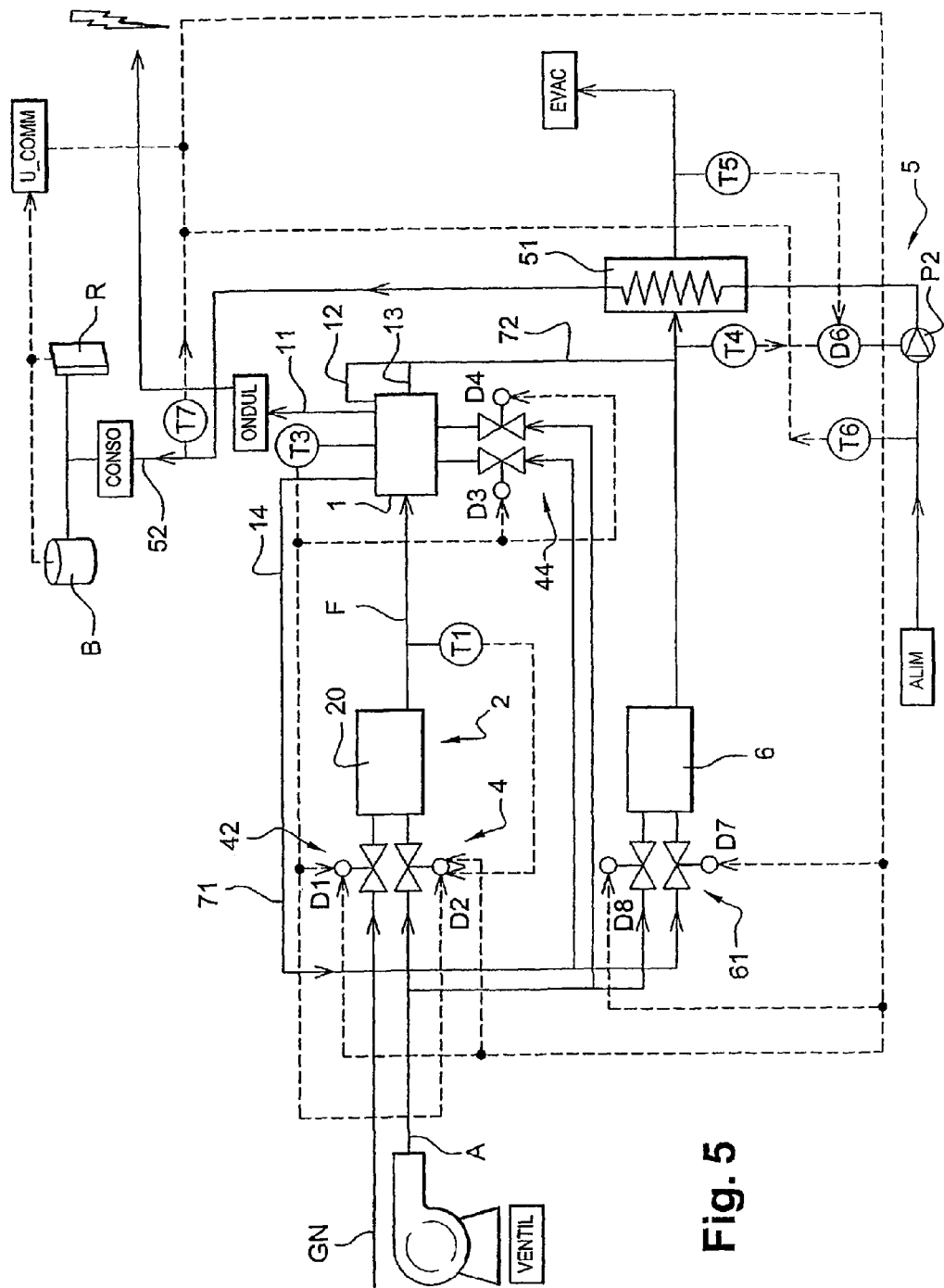
FIG. 5 is a general diagram illustrating a fourth possible embodiment of a production unit conforming to the invention.

The embodiment illustrated FIG. 3 differs from the one illustrated FIG. 2 by the fact that, like the embodiments in FIGS. 4 and 5, it also integrates a second burner 6 thermally coupled to the heat exchanger 51.

This additional burner 6 is supplied with air A and combustible gas GN via valves 61 which act as variable feed controller for the supply of fuel mix to this burner.

The valves 61 are piloted by the command unit U_COMM at least in relation to temperatures T6 and T7 of the cold water and hot water, so as to inject the combustible gas GN into the burner 6 at a flow rate D7, as well as air propelled by the ventilation VENTIL at a flow rate D8.

The embodiment illustrated FIG. 4 differs from the embodiment shown FIG. 3 in that it essentially uses, as regulation means 4, not an exchanger 41 but an adjustable inlet of cool air 43 used to cool the combustion gases F derived from the burner 20 before they heat the enclosure 3.

The flow rate of cool air reaching the mixing area ZM with the combustion gases F is controlled by a valve 43, itself piloted by the command unit U_COMM at least in relation to temperatures T1 and T2 upstream and downstream of the mixing area ZM, and in relation to temperature T3 of the fuel cell.

To implement the embodiment shown FIG. 4, it is preferable, as burner 20, to have recourse to a catalytic burner whose combustion gases F have a temperature T1 which can be adjusted down to a relatively low value, e.g. no more than 600° C.

With said catalytic burners, it is also possible to consider implementing the embodiment illustrated FIG. 5, which differs from the preceding embodiment in that, as regulation means 4, it only uses the supply valves 42 feeding the burner 20.

In this case, and having regard to the absence of an exchanger 41 and mixing area ZM, the temperature T2 of the combustion gases reaching the enclosure 3 of the fuel cell 1 merges with the temperature T1 of the combustion gases leaving the burner 20.

The invention claimed is:

1. Energy production unit comprising:
   a fuel cell confined in a thermal insulation enclosure; and
   a heat source thermally coupled to the fuel cell at least to allow a rise in temperature of the fuel cell, the heat source comprising at least a first radiating burner, wherein
   the thermal insulation enclosure is heated by combustion gases derived from the first burner and includes at least one radiation shield protecting the enclosure against infrared radiation emitted by the first burner, and
   the unit also comprises temperature regulation means able to control, from around 200° C. to at least 800° C., the temperature of the combustion gases heating the enclosure.

2. Unit as in claim 1, wherein the regulation means comprise at least one heat exchanger.

3. Unit as in claim 1, wherein the regulation means comprise a variable feed controller for the supply of fuel mix to the first burner.

4. Unit as in claim 3, wherein the first burner is of catalytic combustion type.

5. Unit as in claim 1, wherein the regulation means comprise an adjustable cold air inlet used to cool the combustion gases derived from the first burner before they heat the enclosure.

6. Unit as in claim 1, wherein the fuel cell is of solid oxide type.

7. Unit as in claim 1, further comprising heat circulation means comprising a heat exchanger and a heating circuit,
   wherein the energy production unit is configured to allow the simultaneous production of heat and electricity.

8. Unit as in claim 2, further comprising heat circulation means comprising a heat exchanger and a heating circuit,
   wherein the exchanger of the regulation means is mounted in parallel with the heat exchanger of the heat circulation means.

9. Unit as in claim 7, further comprising a second burner thermally coupled to the heat exchanger of the heat circulation means such that fluid
   flowing through said heat exchanger is heated by the second burner.

10. Unit as in claim 1,
    wherein the fuel cell is supplied with combustible gas, and the unit also comprises a recycling channel directing non-burnt combustible gas, leaving the fuel cell, towards a burner.

11. Unit as in claim 1, further comprising a cooling channel directing the burnt gases leaving the fuel cell towards an exchanger.

12. An energy production unit comprising:
a fuel cell confined in a thermal insulation enclosure;
means for regulating temperature; and
a heat source thermally coupled to the fuel cell to modify the temperature of the fuel cell, the heat source comprising at least a first radiating burner, wherein
the thermal insulation enclosure is heated by combustion gases derived from the first burner and includes at least one radiation shield which protects the enclosure against infrared radiation emitted by the first burner, and
the means for regulating temperature controls the temperature of the combustion gases heating the enclosure from about 200° C. to about 800° C.

13. The energy production unit according to claim 12, wherein the means for regulating temperature comprise at least one heat exchanger.

14. The energy production unit according to claim 12, wherein the means for regulating temperature comprise a variable feed controller that supplies a fuel mix to the first burner.

15. The energy production unit according to claim 14, wherein the first burner is a catalytic combustion burner.

16. The energy production unit according to claim 12, wherein the means for regulating temperature comprises an adjustable cold air inlet used to cool the combustion gases derived from the first burner before they heat the thermal insulation enclosure.

17. The energy production unit according to claim 12, wherein the fuel cell is a solid oxide fuel cell.

18. The energy production unit according to claim 12, further comprising means for circulating heat having a heat exchanger and a heating circuit,
wherein the energy production unit simultaneously produces heat and electricity.

19. The energy production unit according to claim 13, further comprising means for circulating heat having a heat exchanger and a heating circuit,
wherein the at least one exchanger of the means for regulating temperature is configured in parallel with the heat exchanger of the means for circulating heat.

20. The energy production unit according to claim 18, further comprising a second burner thermally coupled to the heat exchanger of the means for circulating heat such that fluid flowing through said heat exchanger is heated by the second burner.

21. The energy production unit according to claim 12, further comprising a recycling channel,
wherein the fuel cell is supplied with combustible gas, and the recycling channel directs non-burnt combustible gas leaving the fuel cell toward the first radiating burner.

22. The energy production unit according to claim 12, further comprising a cooling channel that directs burnt gases leaving the fuel cell toward a heat exchanger.

23. The energy production unit according to claim 1, wherein the at least one radiation shield is arranged between the enclosure and the first burner, the first burner being located external to the enclosure.

24. The energy production unit according to claim 12, wherein the at least one radiation shield is arranged between the enclosure and the first burner, the first burner being located external to the enclosure.

25. An energy production unit comprising:
a fuel cell confined in a thermal insulation enclosure;
a heat source thermally coupled to the fuel cell at least to allow a rise in temperature of the fuel cell, the heat source including at least a first radiating burner;
temperature regulation means able to control, from around 200° C. to at least 800° C., the temperature of combustion gases derived from the first burner and heating the enclosure, the regulation means including at least one first heat exchanger; and
heat circulation means including a second heat exchanger and a heating circuit,
wherein the thermal insulation enclosure is heated by the combustion gases and includes at least one radiation shield protecting the enclosure against infrared radiation emitted by the first burner,
the at least one radiation shield is arranged between the enclosure and the first burner, the first burner being located external to the enclosure, and
the energy production unit is configured to allow the simultaneous production of heat and electricity.

* * * * *